United States Patent [19]

Butcher

[11] 4,018,365

[45] Apr. 19, 1977

[54] VALVE ACTUATORS FOR PRESSURIZED DISPENSERS

[75] Inventor: Roger Anthony Butcher, Horndean, England

[73] Assignee: Aerosol Inventions & Development S.A. AIDSA, Fribourg, Switzerland

[22] Filed: Jan. 30, 1976

[21] Appl. No.: 653,706

[30] Foreign Application Priority Data

Feb. 4, 1975 United Kingdom ............... 4644/75

[52] U.S. Cl. ............................. 222/402.11; 251/89

[51] Int. Cl.² .................... F16K 35/00; B65D 83/14

[58] Field of Search ............. 222/402.11, 384, 402, 222/320, 321; 251/89

[56] References Cited

UNITED STATES PATENTS

| | | | |
|---|---|---|---|
| 2,706,660 | 4/1955 | Johnson et al. | 251/89 |
| 3,422,996 | 1/1969 | Lipman | 222/402.11 |

*Primary Examiner*—Stanley H. Tollberg
*Assistant Examiner*—Hadd Lane
*Attorney, Agent, or Firm*—Scrivener, Parker Scrivener and Clarke

[57] ABSTRACT

An actuator assembly for the pumps or valves of small hand-held dispensers, especially aerosol containers, which are actuated by depression of an actuator member such as a button, includes a stationary component adapted to be mounted on a pressurized dispenser and a collar in screw-threaded engagement with the stationary component and surrounding an actuator member, which collar when tightened down on its screw prevents depression of the actuator member but when turned to slacken it back allows such movement. Preferably the collar moves downwards to tighten it and this movement may be translated into upward movement in opposition to depression of the actuator member by an arrangement of rocking levers.

6 Claims, 1 Drawing Figure

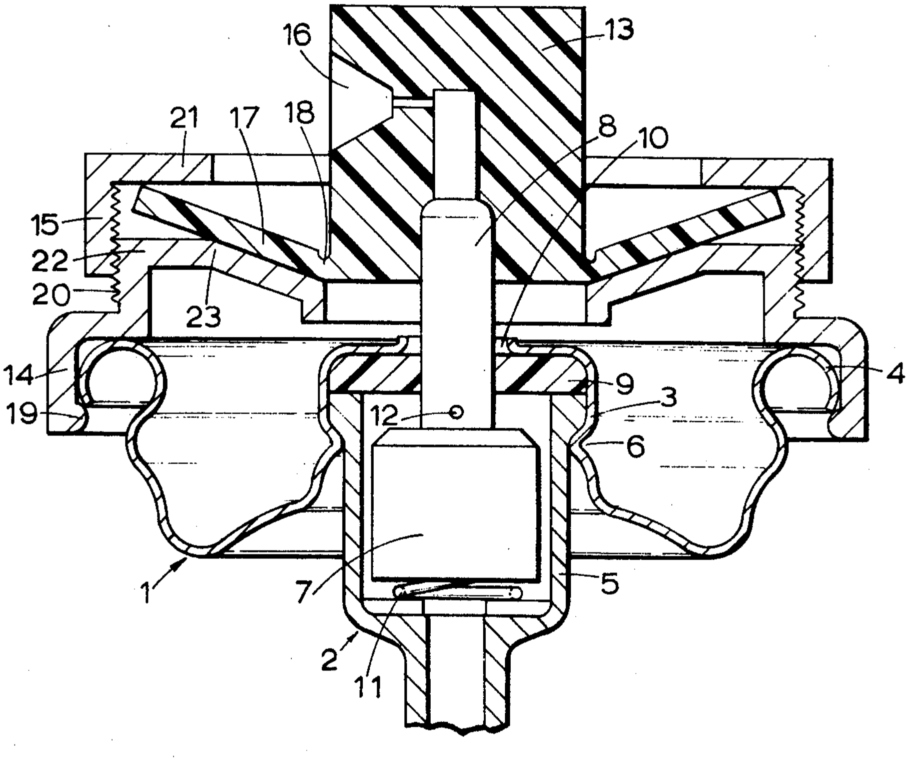
16
13
21
17
18
8
10
15
22
20
23
14
4
9
19
12
3
6
1
7
5
2
11

VALVE ACTUATORS FOR PRESSURIZED DISPENSERS

This invention relates to actuators for the pumps or valves of small hand-held dispensers, especially of pressurised dispensers of the kind commonly known as aerosol containers. In recent years there has been an increasing desire to prevent, or at least make difficult, the use of such dispensers by young children, especially where the product contained in the dispenser is potentially harmful, and various proposals have been made for rendering the valve actuator child-resistant. The aim of the invention is to provide an improved construction for this purpose.

According to the present invention an actuator assembly for a valve or pump of a hand-held dispenser actuated by depression of an actuator member, such as a button for example, comprises a stationary component adapted to be mounted on a hand-held dispenser and a collar in screw-threaded engagement with the stationary component and surrounding an actuator member, which collar when tightened down on its screw prevents depression of the actuator member but when turned to slacken it back allows such movement.

Rotation of the collar causes it to move axially, and this axial displacement is used to restrict the downward travel of the actuator member. Preferably the collar is moved downwards to tighten it, that is in the direction in which the actuator moves on depression, and moves upwards on slackening back. This is the most logical action for the adult user to expect but it means the motion has to be translated into motion in the opposition direction to restrain the button. This is achieved, for example, by radially extending rocking levers of which the midpoints engage fulcrums and the outer ends engage the collar whilst the inner ends engage the button, the arrangement being such that when the collar is tightened down the levers rock so that their inner ends rise and prevent the button being depressed.

One embodiment of the invention will now be described, by way of example only, with reference to the accompanying drawing which shows, in section, a valve actuator embodying the invention fitted to a valve cup and valve for a pressurised dispenser.

The valve mounting cup 1 and valve 2 shown are of a well known kind, the cup comprising a drawn sheet metal body formed with a central upstanding boss 3 and an outer annular rim or curl 4 defining a channel for receiving the rim of an opening in the top end of a cylindrical container (not shown). The valve 2 comprises a housing 5 secured in the central boss 3 of the cup by inwardly crimping a part of the cylindrical wall of the boss as shown at 6. A valve member 7 is located in the housing 5 and is formed integrally with a hollow stem 8 which extends upwardly out of the housing through a gasket 9 and a central opening 10 in the top of the boss 3. A spring 11 in the housing urges the valve upwards so that normally a radial hole 12 in the wall of the stem 8 is covered by the gasket 9. The valve is shown in the drawing in its open position, that is with stem 8 pressed down against the spring 11 and the radial hole 6 forming a passage between the hollow stem 8 and the interior of the valve housing 5.

The valve 2 is actuated by an assembly comprising a button 13, a fixed body component 14 and a rotatable collar 15. The button 13 is of cylindrical form with a spray orifice 16 in its side and is mounted on the upper end of the hollow stem 8. The button 13 is formed of a plastics material integrally with a pair of radially extending arms 17 connected to it by hinge portions 18.

The fixed body component 14 is of stepped cylindrical form, the portion which is of larger diameter being a close fit over the rim 4 of the mounting cup 1 and being provided with an annular rib 19 on its inner face to retain it on the rim 4, and the portion which is of smaller diameter having a thread 20 on its outer face. The collar 15 is provided on its inner face with a thread complementary to thread 20 and the collar is thus mounted on the fixed body component 14. The fixed body component 14 and the collar 15 are each provided with an internal flange 21 and 22 between which the arms 17 of the button 13 are located. The flange 21 on the collar 15 extends radially and engages the outer ends of the arm 17. The flange 22 on the fixed body component 14 has an outer radial portion and an inner frusto-conical portion, an annular ridge 23 being formed at the join between the two portions and engaging the middle of the arms 17. The arms are thus arranged as levers hinged to the button with the ridge 23 acting as a fulcrum.

The collar can be moved downwards by tightening the screw or upwards by slackening it back. When the collar is slackened back the button 13 is free to move downwards and open the valve while the levers 17 pivot about the fulcrum 23. However when the collar is tightened down the outer ends of the levers 17 are held down against the outer portion of the flange 22 of the fixed body component by the flange 21 of the collar and the button 13 thus restrained against downward movement.

The embodiment shown has one particular arrangement of collar and levers for restraining movement of the button 13 but clearly other arrangements may be provided. If desired more than two levers may be provided. Further only one type of valve is shown but the actuator assembly may be used with any other valve of the kind commonly known as aerosol valves which open on depression of a button or other form of actuator member, and it may also be applied to the actuator member of a pump, which is fitted to a non-pressurised dispenser but of which the movement for actuation is similar to that of a valve button.

I claim:

1. An actuator assembly for the outlet device of a hand-held dispenser of the kind having a depressible operating stem, comprising an actuator member mountable on the stem, whereby the device can be operated by depression of said member, a stationary component mountable on the dispenser, a collar in screw-threaded engagement with said stationary component and surrounding said actuator means, and means interconnecting said collar and said actuator member, said collar being rotatable to move it between a first position at which said means prevents depression of said actuator member and to a second position in which said actuator is free to be depressed.

2. An assembly in accordance with claim 1 wherein stop means for the screw-threaded engagement of said collar with said stationary component defines said first position, said collar being tightened down against said stop means when in said first position.

3. An assembly in accordance with claim 2 wherein the direction of movement of said collar when being moved towards said first position is the same as the direction in which said actuator member moves on depression to operate said outlet drive.

4. An assembly according to claim 3 wherein said means comprises radially extending lever means operative to tilt and thereby translate movement of said collar towards said first position into movement opposing depression of said actuator member.

5. An assembly according to claim 4 wherein said actuator member is formed of a plastics material integral with said lever means and including a hinge portion formed between said lever means and said actuator member.

6. An assembly in accordance with claim 4 wherein a fulcrum is formed on said stationary component for said lever means.

* * * * *